United States Patent
Wu et al.

(10) Patent No.: US 12,465,394 B2
(45) Date of Patent: Nov. 11, 2025

(54) MEDICAL CUTTING ASSEMBLY AND VOLUME REDUCTION CATHETER SYSTEM

(71) Applicant: Lifetech Scientific (Shenzhen) Co. Ltd., Guangdong (CN)

(72) Inventors: Xingyu Wu, Shenzhen (CN); Han Long, Shenzhen (CN); Zhenbiao Zhou, Shenzhen (CN)

(73) Assignee: Lifetech Scientific (Shenzhen) Co. Ltd., Guangdong (CN)

( * ) Notice: Subject to any disclaimer, the term of this patent is extended or adjusted under 35 U.S.C. 154(b) by 323 days.

(21) Appl. No.: 18/024,228

(22) PCT Filed: Sep. 2, 2021

(86) PCT No.: PCT/CN2021/116163
§ 371 (c)(1),
(2) Date: Mar. 1, 2023

(87) PCT Pub. No.: WO2022/048586
PCT Pub. Date: Mar. 10, 2022

(65) Prior Publication Data
US 2023/0263549 A1    Aug. 24, 2023

(30) Foreign Application Priority Data

Sep. 3, 2020 (CN) .......................... 202010918066.4
Dec. 31, 2020 (CN) .......................... 202011639457.9
Dec. 31, 2020 (CN) .......................... 202011642225.9

(51) Int. Cl.
*A61B 17/3207* (2006.01)
*A61B 90/00* (2016.01)

(52) U.S. Cl.
CPC .............. *A61B 17/320783* (2013.01); *A61B 2017/320741* (2013.01); *A61B 2017/320775* (2013.01); *A61B 2090/036* (2016.02)

(58) Field of Classification Search
CPC .... A61B 17/320725; A61B 17/320783; A61B 17/320758; A61B 2017/320766; A61B 2017/320775

See application file for complete search history.

(56) References Cited

U.S. PATENT DOCUMENTS 6,156,046 A    12/2000 Passafaro et al.
11,207,096 B2  12/2021 To et al.
(Continued)

FOREIGN PATENT DOCUMENTS

CN    101795630 A    8/2010
CN    109717925 A    5/2019
WO    WO2014059150 A1    4/2014

OTHER PUBLICATIONS

European Search Report dated Jul. 1, 2024 for corresponding European Application No. 21 86 3650.
(Continued)

*Primary Examiner* — Tuan V Nguyen
(74) *Attorney, Agent, or Firm* — Raymond Sun (57) ABSTRACT

A medical cutting assembly (10) and a volume reduction catheter system are provided. The medical cutting assembly (10) includes a cutter head (101) and a limiting member (102) connected to the cutter head (101), where the cutter head (101) includes a delivery portion (1012); the limiting member (102) includes a decomposing portion (1021); and when the cutter head (101) and the limiting member (102) rotate relative to each other, the decomposing portion (1021) extends through the delivery portion (1012). The volume reduction catheter system includes a cutting section and a transfer section. The delivery portion (1012) can transfer excess tissue cut by the cutter head (101) from a distal end to a proximal end. The limiting member (102) is provided with the decomposing portion (1021). When the cutter head (101) and the limiting member (102) rotate relative to each (Continued)

other, the decomposing portion (1021) extends through the delivery portion (1012), such that the decomposing portion (1021) rotating at a high speed further cuts and decomposes the cut tissue in the delivery portion (1012) into smaller tissues, so as to achieve improved decomposition of the tissue in order to facilitate the subsequent discharge of the excess tissue.

17 Claims, 8 Drawing Sheets

(56) References Cited

U.S. PATENT DOCUMENTS

| | | |
|---|---|---|
| 2007/0265647 A1 | 11/2007 | Bonnette |
| 2009/0018567 A1 | 1/2009 | Escudero et al. |
| 2010/0324472 A1 | 12/2010 | Wulfman |
| 2012/0083810 A1 | 4/2012 | Escudero et al. |
| 2012/0109171 A1* | 5/2012 | Zeroni ........... A61B 17/320758 606/159 |
| 2015/0133977 A1 | 5/2015 | To et al. |
| 2017/0360467 A1 | 12/2017 | Taylor |
| 2018/0280045 A1 | 10/2018 | Malhi et al. |

OTHER PUBLICATIONS

International Search Report dated Dec. 8, 2021 for corresponding PCT Application No. PCT/CN2021/116163.
Office Action dated May 27, 2023 for corresponding China Application No. 202010918066.4.

* cited by examiner

MEDICAL CUTTING ASSEMBLY AND VOLUME REDUCTION CATHETER SYSTEM

TECHNICAL FIELD

The present invention relates to the technical field of medical instruments, in particular, to a medical cutting assembly and a volume reduction catheter system.

BACKGROUND ART

Lower extremity arteriosclerosis obliterans (ASO) is a common and frequently occurring disease in middle-aged and elderly people, and is also an important manifestation of atherosclerosis in lower extremities.

At present, therapies for the lower extremity ASO mainly include a drug therapy, surgery, an endovascular therapy, compound surgery, autologous peripheral blood stem cell transplantation, a gene drug therapy, and the like. The endovascular therapy for the lower extremity ASO has the advantages of minimal invasion, safety, effectiveness, fast recovery and the like, and has become the first choice for the treatment of the lower extremity ASO. At present, the endovascular therapy includes conventional percutaneous transluminal angioplasty (PTA) and emerging endovascular volume reduction surgery. Pure PTA has an obvious limitation. Simple expansion of a stenosis segment cannot remove an excess tissue, and it is inevitable that the vascular wall will be stretched, so that barotrauma and dissection can easily result, and post-operation rebound easily occurs, resulting in restenosis. Therefore, PTA is usually combined with endovascular volume reduction. Plaques can be removed via intracutaneous mechanical plaque removal during the endovascular volume reduction, so that a good treatment effect can be achieved in combination with PTA. However, in the existing endovascular volume reduction procedure, a cut excess tissue will be discharged in an original shape after cutting without any post-processing. The decomposition of the excess tissue is not thorough enough, and the transfer process of the excess tissue is not smooth, so the overall work efficiency is low.

SUMMARY OF THE INVENTION

To this end, the present invention provides a medical cutting assembly and a corresponding volume reduction catheter system to solve the problems of a non-smooth transfer process and low overall work efficiency due to the fact that an existing endovascular volume reduction device cannot thoroughly decompose an excess tissue.

The technical solutions adopted by the present invention are as follows.

A medical cutting assembly includes a cutter head and a limiting member rotatably connected to the cutter head, wherein the cutter head includes a delivery portion; the limiting member includes a decomposing portion; and when the cutter head and the limiting member rotate relative to each other, the decomposing portion extends through the delivery portion.

In one embodiment, the cutter head includes a cutting portion; the cutting portion includes a plurality of cutting edges extending from a proximal end to a distal end; the delivery portion includes delivery slots located between two adjacent cutting edges; at least one cutting edge is provided with a through slot; the through slot is communicated with the delivery slot adjacent to the cutting edge; and when the cutter head and the limiting member rotate relative to each other, the decomposing portion extends through the delivery slots for multiple passes.

In one embodiment, there is one or more decomposing portions; and during rotation of the cutter head, at least one part of at least one of the decomposing portions is always located in one through slot to axially limit the cutter head.

In one embodiment, there are a plurality of decomposing portions, at least two of which are spaced apart from each other along a circumferential direction or an axial direction of the limiting member.

In one embodiment, the cutting edges extend spirally from the proximal end to the distal end, and helical angles of the delivery slots gradually decrease from the distal end to the proximal end.

In one embodiment, the medical cutting assembly further includes a cannula connected to the limiting member; the cannula surrounds the cutter head and the limiting member; and the cannula at least covers the decomposing portion in the axial direction.

In one embodiment, the cannula is provided with several decomposing slots; and when the cutter head and the limiting member rotate relative to each other, the decomposing slots and the delivery portions communicate with each other at certain times.

In one embodiment, each decomposing portion is located in the middle of the limiting member, and one part of the limiting member at least surrounds the proximal end of the cutter head.

In one embodiment, the axial width of the decomposing portion is less than the axial width of each through slot; and the axial position of an end portion of proximal end of the decomposing portion relative to an end portion of the proximal end of the through slot is adjustable.

A volume reduction catheter system is further provided, including a cutting section and a transfer section which are sequentially arranged, wherein the cutting section includes a cutting assembly; the transfer section includes a transmission shaft fixedly connected with the cutting assembly, and a cannula surrounding a surface of the transmission shaft; the transmission shaft rotates relative to the cannula; the transmission shaft is provided with a transfer slot; the cannula is axially provided with a cleaning and decomposing member; and the transmission shaft is axially provided with a filter.

In one embodiment, there are a plurality of cleaning and decomposing members and a plurality of filters; and at least one cleaning and decomposing member is located at the distal ends of all the filters.

In one embodiment, the volume reduction catheter system further includes at least one cleaning and decomposing portion, wherein the cleaning and decomposing portion includes the cleaning and decomposing member and a filter located at a proximal end of the cleaning and decomposing portion; and the filter includes a first filter and/or a second filter.

In one embodiment, the filter includes the first filter; and a space is provided between an outer side of the first filter and an inner wall of the cannula.

In one embodiment, the filter includes the second filter; and a space is provided between an inner side of the second filter and the transmission shaft.

In one embodiment, the second filter is fixed on the transmission shaft through a connecting rod, and an outer side of the second filter is coupled to the inner wall of the cannula.

In one embodiment, the radial thickness of the filter is less than or equal to the radial thickness of the decomposing member.

In one embodiment, the cleaning and decomposing portion includes a first cleaning and decomposing portion with the first filter and a second cleaning and decomposing portion with the second filter; and the first cleaning and decomposing portion and the second cleaning and decomposing portion are arranged alternately in turn.

A volume reduction catheter system is further provided, including a cutting section and a transfer section which are sequentially arranged, wherein the cutting section includes a cutting assembly; the transfer section includes a transmission shaft fixedly connected with the cutting assembly, and a cannula surrounding a surface of the transmission shaft; the transmission shaft rotates relative to the cannula; the transmission shaft is provided with a transfer slot; a cleaning and decomposing portion is arranged on an inner wall of the cannula; and the cleaning and decomposing portion includes a decomposing member extending towards the transmission shaft.

The embodiments of the present invention have the following beneficial effects.

A medical cutting assembly of the present invention includes a cutter head and a limiting member connected to the cutter head; the cutter head includes a cutting portion and a delivery portion; the limiting member includes a decomposing portion; and when the cutter head and the limiting member rotate relative to each other, the decomposing portion extends through the delivery portion. The delivery portion can transfer excess tissue cut by the cutter head from a distal end to a proximal end. The limiting member is provided with the decomposing portion. When the cutter head and the limiting member rotate relative to each other, the decomposing portion extends through the delivery portion, such that the decomposing portion rotating at a high speed further cuts and decomposes the cut tissue in the delivery portion into tissue with a smaller volume, which is more conductive to the subsequent discharge of the cut tissue. The volume reduction catheter system of the present invention achieves cutting and decomposition of target tissue in the body and transfer the tissue out of the body, so that tissue is completely cut and can be more favorably transferred, which improves the overall work efficiency.

DETAILED DESCRIPTION OF THE INVENTION

In order to facilitate an understanding of the prevent invention, the present invention will be described more comprehensively below with reference to related accompanying drawings. Preferred embodiments of the present invention are illustrated in the drawings. However, the present invention can be embodied in many different forms, and is not limited to the embodiments described herein. On the contrary, the purpose of providing these embodiments is to make the content disclosed by the present invention understood more thoroughly and comprehensively.

In the description of the present invention, for orientation descriptions, orientations or positional relationships indicated by the terms "upper", "lower", "front", "rear", "left", "right", and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so that these terms are not construed as limiting the present invention. If a certain feature is referred to being "disposed", "fixed", or "connected" to another feature, it can be directly disposed, fixed, or connected to another feature, or indirectly disposed, fixed, or connected on another feature.

In the description of the embodiments of the present invention, if it refers to "several", it means more than one; if it refers to "multiple", it means two or more; if it refers to "greater than", "less than", "more than", it should be understood as not including this number; and if it involves "above", "below", and "within", it should be understood as including this number. If it refers to "first", and "second", it should be understood that they are for the purpose of distinguishing the technical features, and cannot be understood as indicating or implying the relative importance or implicitly specifying the number of the indicated technical features or implicitly specifying the order of the indicated technical features.

In addition, unless otherwise defined, the technical terms and scientific terms used in the embodiments of the present invention have the same meanings as those commonly understood by those skilled in the art. The terms used in the description of the present invention herein are merely to describe the specific embodiments, not intended to limit the present invention. The term "and/or" used herein includes any and all combinations of one or more related listed items.

It should be noted that in the field of interventional medical instruments, an end, closer to an operator, of a medical instrument that is implanted into a human body or an animal body is usually referred to as "proximal end", and an end farther from the operator is referred to as "distal end". The "proximal end" and the "distal end" of any component of a medical instrument are defined according to this principle. The "axial direction" usually refers to a longitudinal direction of a medical instrument during delivery; the "radial direction" usually refers to a direction perpendicular to the "axial direction" of the medical instrument; and the "axial direction" and the "radial direction" of any component of a medical instrument are defined according to this principle.

Embodiment 1

Embodiment 1 provides a medical cutting assembly and a corresponding volume reduction catheter system. FIG. 1 to FIG. 4 correspond to the medical cutting assembly 10, and FIG. 5 to FIG. 9 correspond to the volume reduction catheter system 11.

Figure 1:
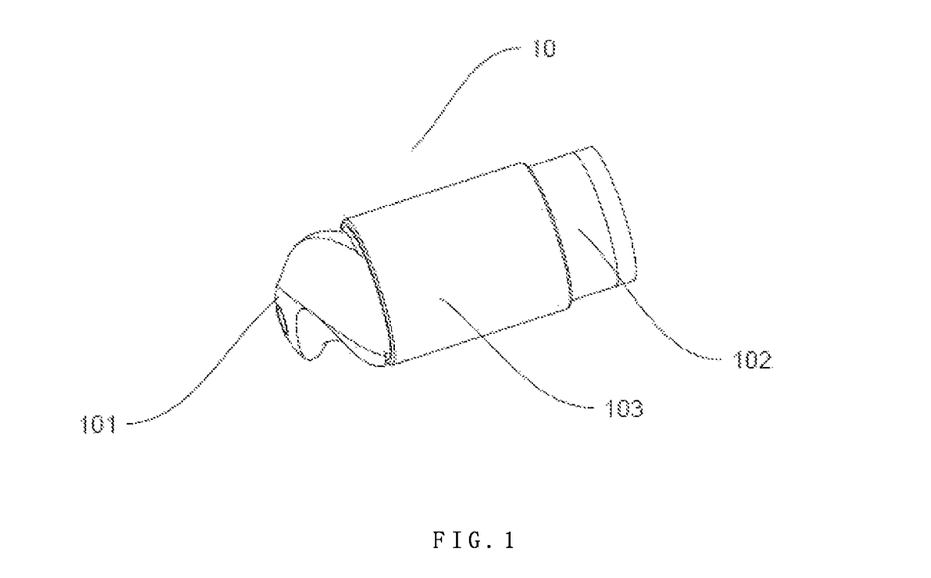
FIG. 1 is an overall schematic diagram of a medical cutting assembly in Embodiment 1.
Figure 2:
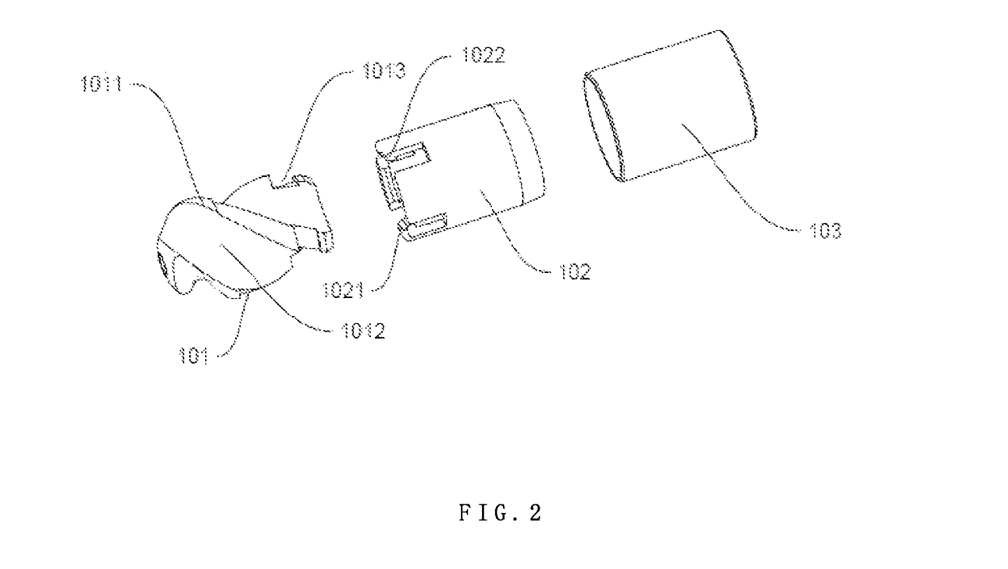
FIG. 2 is an exploded diagram of the medical cutting assembly in Embodiment 1.

Referring to FIG. 1 to FIG. 2, FIG. 1 is an overall schematic diagram of a medical cutting assembly in Embodiment 1, and FIG. 2 is an exploded diagram of the medical cutting assembly in Embodiment 1. In this embodiment, the medical cutting assembly 10 includes a cutter head 101, a limiting member 102 and a first cannula 103 which are coaxially assembled. The cutter head 101 is a main working component for cutting and transferring an excess tissue. The limiting member 102 is rotatably connected with the cutter head 101, and the limiting member 102 can axially limit the cutter head 101. In this embodiment, a distal end of the limiting member 102 is clamped with a proximal end of the cutter head 101 and can rotate relative to each other. In addition, the limiting member 102 can decompose tissue transferred by the cutter head 101 again. The first cannula 103 surrounds the proximal end of the cutter head 101. On the one hand, the proximal end of the cutter head 101 is prevented from rotatably cutting a normal vascular wall or normal tissue, and on the other hand, the radial movement of the cutter head 101 is also limited, i.e., the cutter head 101 is radially limited.

The first cannula 103 surrounds the cutter head 101, which limits the radial movement of the cutter head 101. In addition, when the cutter head 101 cuts and captures narrow tissue in a blood vessel at the distal end of the cutter head 101, the cut tissue will be transferred from the distal end of the medical cutting assembly 10 to the proximal end along a delivery slot 1012. The first cannula 103 may also prevent the cut tissue from leaving the delivery slot 1012 of the cutter head 101 directly along a radial direction. That is, the first cannula 103 cooperates with the cutter head 101 to make the captured narrow tissue move towards the proximal end of the medical cutting assembly 10 along the delivery slot 1012, so as to accomplish the tissue cutting and discharge function of the instrument. Specifically, the first cannula 103 covers a proximal end portion of the cutter head 101 and a distal end portion of the limiting member 102.

In another embodiment, the medical cutting assembly 10 does not include the first cannula 103. At this time, the medical cutting assembly 10 can still cut and decompose tissue.

In another embodiment, the proximal end of the cutter head 101 in the medical cutting assembly 10 may be placed in a sheath to work, so as to collect the cut tissue with the sheath.

Figure 3:
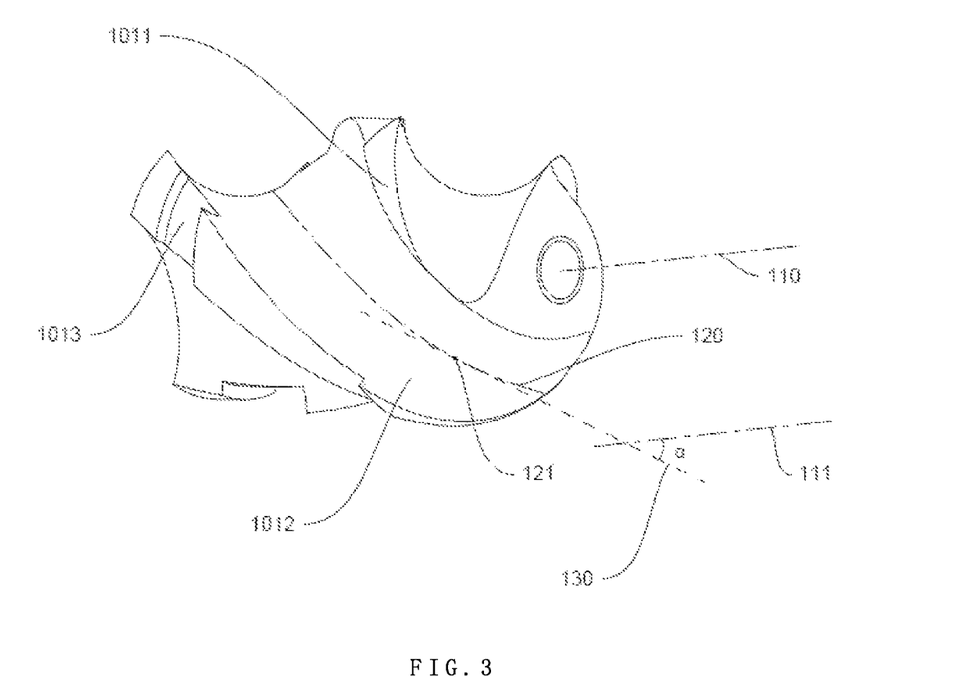
FIG. 3 is a schematic structural diagram of the cutter head in Embodiment 1.
Figure 4:
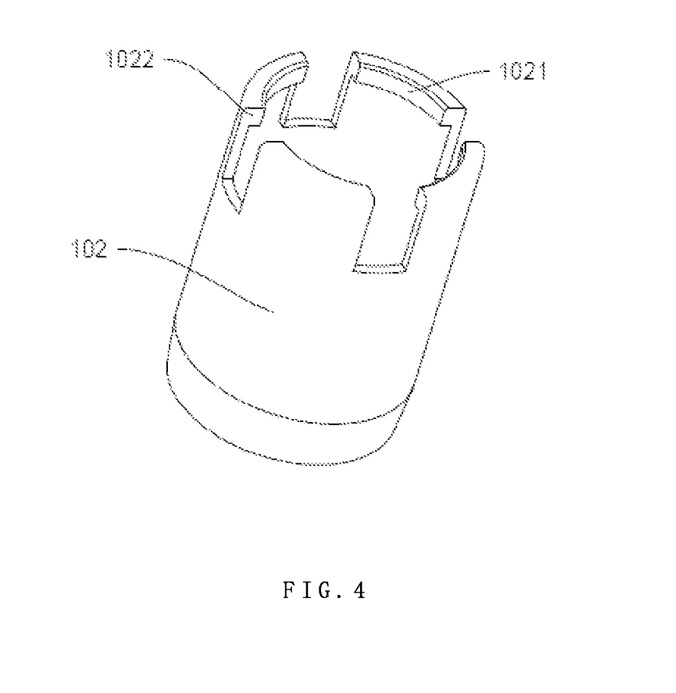
FIG. 4 is a schematic structural diagram of the limiting member in Embodiment 1.

Referring to FIG. 3 and FIG. 4, FIG. 3 is a schematic structural diagram of the cutter head 101 in Embodiment 1, and FIG. 4 is a schematic structural diagram of the limiting member 102 in Embodiment 1. Specifically, the proximal end of the cutter head 101 is rotatably connected with the distal end of the limiting member 102, and the axial movement of the cutter head 101 towards the distal end is limited by the limiting member 102. During actual operation, the limiting member 102 is relatively fixed, and the cutter head 101 rotates around its own rotation axis 110 to achieve a rotatable cutting function. A surface of the cutter head 101 is provided with at least two cutting edges 1011. The cutting edges 1011 extend from the distal end of the cutter head 101 to the proximal end and are spirally distributed. The cutter head 101 drives the cutting edges 1011 to rotate, so as to cut an excess tissue in a blood vessel. In fact, a cutting portion of each cutting edge 1011 is a distal end portion of the cutting edge 1011. The position where proximal end portions of the cutting edges 1011 are located is surrounded by the first cannula 103 to limit the radial movements of the cutting edges 1011 and to protect a blood vessel or tissue at the position where the proximal end portions of the cutting edges 1011 are located from being cut by the proximal end portions of the cutting edges 1011. One delivery slot 1012 spirally extending along an axial direction is arranged between two adjacent cutting edges 1011. With the rotation of the cutter head 101 around its rotation axis 110, the cut tissue moves along the delivery slots 1012 between the cutting edges 1011 and gradually approaches the proximal end of the medical cutting assembly 10 in the axial direction. In order to obtain a larger cutting area, the maximum outer diameter of an exposed portion at the distal end of the cutter head 101 is equal to an outer diameter of the first cannula 103.

Each delivery slot 1012 is a spiral slot. An included angle between a tangent line 130 of any point 121 on a slot bottom center line 120 of the delivery slot 1012 and the rotation axis 110 of the cutter head 101 is the spiral angle of the delivery slot 1012. In FIG. 3, a projection of the rotation axis 110 on a plane passing through the tangent line 130 and parallel to the rotation axis 110 is a projection line 111, so an included angle α between the tangent line 130 and the projection line 111 is the spiral angle. Due to the existence of the spiral angle, when the cutter head 101 rotates, the delivery slot 1012 generates an axial component force on the captured tissue, thus driving the captured tissue to move axially. The cutter head 101 can not only cut the narrow tissue in the blood vessel, but also enables the cut tissue to spirally move towards the proximal end of the medical cutting assembly 10 along the delivery slots 1012 and then reach a predetermined location.

In another embodiment, in order to achieve a better delivery effect, the spiral angles of the delivery slots 1012 gradually decrease from the distal end of the cutter head 101 to its proximal end. Correspondingly, since each delivery slot 1012 is formed by enclosing two adjacent cutting edges 1011, the spiral angle of the cutting edge 1011 also changes as the spiral angle of the delivery slot 1012 changes. For the entire cutter head 101, a large spiral angle is set at the distal end portion of each cutting edge 1011, which is conducive to cutting and capturing tissue and has high cutting efficiency. With the extension of the delivery slots 1012 to the proximal end, the spiral angles of the delivery slots 1012 gradually decrease, which is conducive to the delivery of the captured tissue to the proximal ends of the cutting edges 1011.

In another embodiment, the plurality of cutting edges 1011 extend straight along the axis, and the delivery slots 1012 located between two adjacent cutting edges 1011 are straight slots extending axially and parallel to the rotation axis 110. Since the distal end of the cutter head 101 cuts excess tissue, the cut tissue gradually enters the distal ends of the delivery slots 1012. As more and more tissue enter the delivery slots 1012, the first cut tissue is pushed to move gradually and along the slots towards the proximal ends of the delivery slots 1012. Therefore, the spiral shape of each delivery slot 1012 in Embodiment 1 is only a choice that enables the delivery slot 1012 to have good delivery capacity. The specific shape of the delivery slot 1012 does not need to be limited.

In Embodiment 1, the proximal end of the cutter head 101 is provided with a plurality of through slots 1013. Each through slot 1013 circumferentially penetrates through the cutting edge 1011 where it is located, and is connected with the delivery slot 1012 adjacent to the cutting edge 1011. As shown in FIG. 4, a plurality of decomposing members 1021 are arranged at a position that is close to the end portion of the distal end of the limiting member 102. Each decomposing member 1021 is shaped like a boss. The decomposing members 1021 protrude inwardly from the inner wall of the limiting member 102, and the plurality of decomposing members 1021 are spaced apart along the circumferential direction of the limiting member 102. When the cutter head 101 rotates, the decomposing members 1021 alternately enter the through slots 1013 and the delivery slots 1012. The decomposing members 1021 collide with the tissues in the delivery slots 1012 and decompose the tissues into smaller tissues. In this embodiment, the plurality of decomposing members 1021 move at the same time, alternately pass through the plurality of through slots 1013 and the plurality of corresponding delivery slots 1012, so that the processing efficiency is high.

In another embodiment, each decomposing member 1021 is set to be in other shapes, including a blade shape, a zigzag shape and the like. That is, the specific shape of the decomposing member 1021 in the medical cutting assembly 10 in the corresponding embodiment of the present application is not limited.

In addition, the decomposing members 1021 are clamped into the through slots 1013 to form clamped structures, which can result in axial limitation to the cutter head 101 without affecting the rotation of the cutter head 101. That is, during the rotation of the cutter head 101, if there is no other structure limiting the cutter head 101 axially, at least one part of at least one decomposing member 1021 is always located in one through slot 1013 to maintain the axial limitation to the cutter head 101.

In another embodiment, the decomposing members 1021 only play a role of decomposition. A limiting block is additionally arranged on the limiting member 102, and a locating slot is also arranged at the proximal end of the cutter head 101. The limiting block is clamped with the locating slot to achieve the axial limitation to the cutter head 101. When the cutter head 101 and the limiting members 102 rotate relative to each other, the limiting block does not need to intersect with the delivery slots 1012, but the limiting block is always clamped with the locating slot, and the decomposing members 1021 can be completely separated from the through slots 1013.

In another embodiment, when vertical distances from outer surfaces of the plurality of cutting edges 1011 on the cutter head 101 to the rotation axis 110 are different (that is, the heights of the cutting edges 1011 are different), at a certain axial position of the cutter head 101, one or more corresponding through slots 1013 can be provided along the circumferential direction, and one or more decomposing members 1021 can also be provided along the circumferential direction. When the cutter head 101 and the limiting member 102 rotate relative to each other, the decomposing member 1021 passes through the through slot 1013 along the circumference without hindrance. Generally, each cutting edge 1011 is provided with the through slot 1013. There is a special case where some of the cutting edges 1011 are not provided with the through slots 1013. In this special case, the distance from the bottom surface of each decomposing member 1021 to the rotation axis 110 is greater than the distance from the outer surface of the cutting edge 1011 without the through slot 1013 to the rotation axis 110. This allows the decomposing member 1021 to pass through the through slot 1013 along the circumference without hindrance and will not collide with the cutting edge 1011 without the through slot 1013.

When there is one through slot 1013 and one corresponding decomposing member 1021, the through slot 1013 is arranged at the proximal end of the cutting edge 1011 with a maximum vertical distance from its outer surface to the rotation axis 110. In the process of the relative rotation between the through slot 1013 and the decomposing member 1021, one part of the decomposing member 1021 is always located in the through slot 1013.

When there is one through slot 1013 and a plurality of corresponding decomposing members 1021, the through slot 1013 is arranged at the proximal end of the cutting edge 1011 with a maximum vertical distance from its outer surface to the rotation axis 110. In the process of the relative rotation between the through slot 1013 and the decomposing members 1021, the plurality of decomposing members 1021 alternately pass through, in turn, the circumferential delivery slot 1012 and through slot 1013, and one part of at least one decomposing member 1021 is always located in the through slot 1013.

When there is a plurality of through slots 1013 and one corresponding decomposing member 1021, in the process of the relative rotation between the through slots 1013 and the decomposing member 1021, the decomposing member 1021 passes through, in turn, the plurality of circumferential delivery slots 1012 and through slots 1013, and at least one part of the decomposing member 1021 is always located in at least one through slot 1013.

In another embodiment, when one or more through slots 1013 are arranged circumferentially on the cutter head 101, one decomposing member 1021 is correspondingly arranged on the limiting member 102. At this time, a circumferential length (arc length) of a connection between the decomposing member 1021 and the inner wall of the limiting member 102 is greater than a circumferential width of any delivery slot 1012, so as to ensure that at least one part of at least one decomposing member 1021 is always located in one through slot 1013, thus decomposing the cut tissue and maintaining the axial limitation to the cutter head 101.

In another embodiment, the cutter head 101 may be provided with a plurality of through slots 1013 along the axial direction, and correspondingly, the limiting member 102 is provided a plurality of decomposing members 1021 in a spaced apart manner along the axial direction. When the cutter head 101 rotates, the plurality of decomposing members 1021 in the axial direction simultaneously decompose the tissues in the respective corresponding delivery slots 1012. Similarly, at least one part of at least one decomposing member 1021 is always located in one through slot 1013 to maintain the axial limitation to the cutter head 101.

In Embodiment 1, the axial widths of the plurality of decomposing members and axial widths of the plurality of through slots 1013 are equal or slightly different. On the premise that the plurality of decomposing members 1021 and the plurality of through slots 1013 may be clamped and may rotate relative to each other, the cutter head 101 will not move axially relative to the limiting member 102. Further, in order to allow the relative rotation between the plurality of decomposing members 1021 and the plurality of through slots 1013 to be smoothly transitioned without interference, the axial widths L1 of the plurality of decomposing members 1021 in the entire circumferential direction are the same, and the axial widths L2 of the plurality of corresponding through slots 1013 in the circumferential direction are also the same.

In another embodiment, the axial widths L1 of the decomposing members 1021 and the axial widths L2 of the through slots 1013 in the cutter head 101 may be set to be different values. That is, the axial positions of the decomposing members 1021 in the through slots 1013 may change. The axial width L1 of each decomposing member 1021 is less than the axial width L2 of each through slot 1013, and the medical cutting assembly 10 has an axial expansion length variation ((L2-L1)) along the axial direction. By means of adjusting an axial distance between the end portion of the proximal end of the decomposing member 1021 and the end portion of the proximal end of the through slot 1013, an extension length of the cutter head 101 from the first cannula 103 is changed. When the medical cutting assembly 10 does not include the first cannula 103, the axial distance between the end portion of the distal end of the cutter head 101 and the end portion of the distal end of the limiting member 102 is changed by means of changing the axial distance between the end portion of the proximal end of the decomposing member 1021 and the end portion of the proximal end of the through slot 1013. In fact, no matter whether the medical cutting assembly 10 includes the first cannula 103, adjusting the axial distance between the end portion of the proximal end of the decomposing member 1021 and the end portion of the proximal end of the through slot 1013 is adjusting the axial distance between the end portion of the distal end of the cutter head 101 and the end portion of the distal end of the limiting member 102. Therefore, the cutter head 101 has at least two different extension lengths with respect to the limiting member 102 or the first cannula 103. When the extension length is a maximum, the portion for cutting of the distal end of the cutter head 101 is largest, and the cutter head 101 has the highest cutting ability. At this time, the end portion of the distal end of the decomposing member 1021 presses against the end portion of the distal end of the through slot 1013. The medical cutting assembly 10 in this state is suitable for cutting severely calcified coaxial lesions. When the extension length is a minimum, the portion for cutting of the distal part of the cutter head 101 is smallest, and the cutter head 101 has the lowest cutting ability. At this time, the end portion of the proximal end of the decomposing member 1021 presses against the end portion of the proximal end of the through slot 1013. The medical cutting assembly 10 in this state is suitable for cutting bent and irregular lesions. Therefore, the medical cutting assembly 10 in this embodiment has good adaptability to different actual clinical situations.

In Embodiment 1, each decomposing member 1021 includes a side surface 1022. When the cutter head 101 rotates to cut excess tissues in a blood vessel, the tissues cut by the cutter head 101 reach the through slots 1013 along the delivery slots 1012. At this time, the limiting member 102 is relatively fixed, the cutter head 101 rotates, and the delivery slots 1012 rotate with the cutter head 101, so that the tissues in the delivery slots 1012 can be driven to rotate, the through slots 1013 can also be driven to be intersected with and separated from the decomposing members 1021, that is, the side surfaces 1022 of the decomposing members 1021 are driven to constantly enter and leave the delivery slots 1012. At this time, the tissues constantly collide with the side surfaces 1022 of the decomposing members 1021 and are cut after dislocation, so that the tissues are decomposed into smaller tissues, which is more conducive to subsequent tissue delivery. In this embodiment, the side surface 1022 is set as a plane perpendicular to an end face of the proximal end or an end face of the distal end of the decomposing member 1021.

In another embodiment, the side surface 1022 is set as an inclined plate tilting to an end face of the proximal end or an end face of the distal end of the decomposing member 1021.

In another embodiment, the side surface 1022 may also be set as non-planar. For example, the side surface 1022 may be set as an arcuate surface or other uniform curved surface, or one part of the side surface 1022 may be raised or depressed to form an irregular surface.

Figure 5:
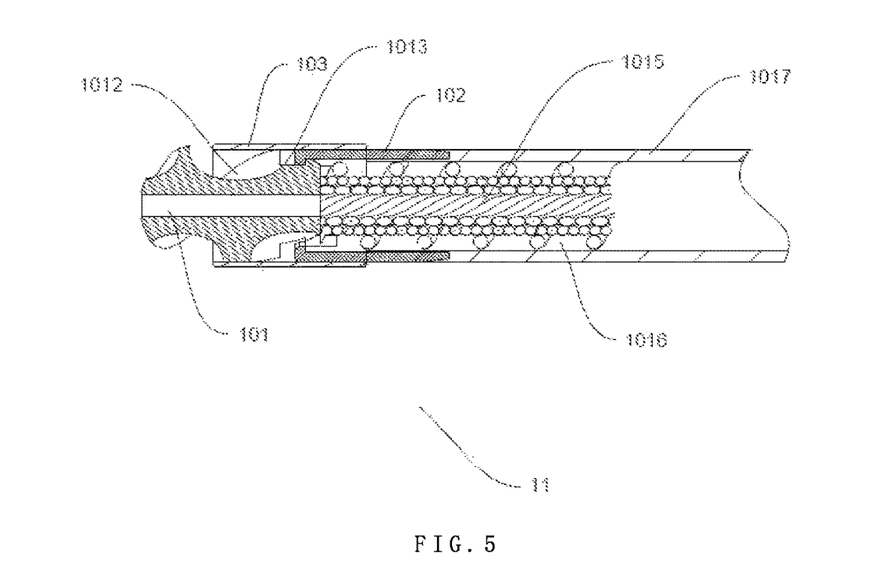
FIG. 5 is a schematic operation diagram of a distal end of a volume reduction catheter system in Embodiment 1.
Figure 6:
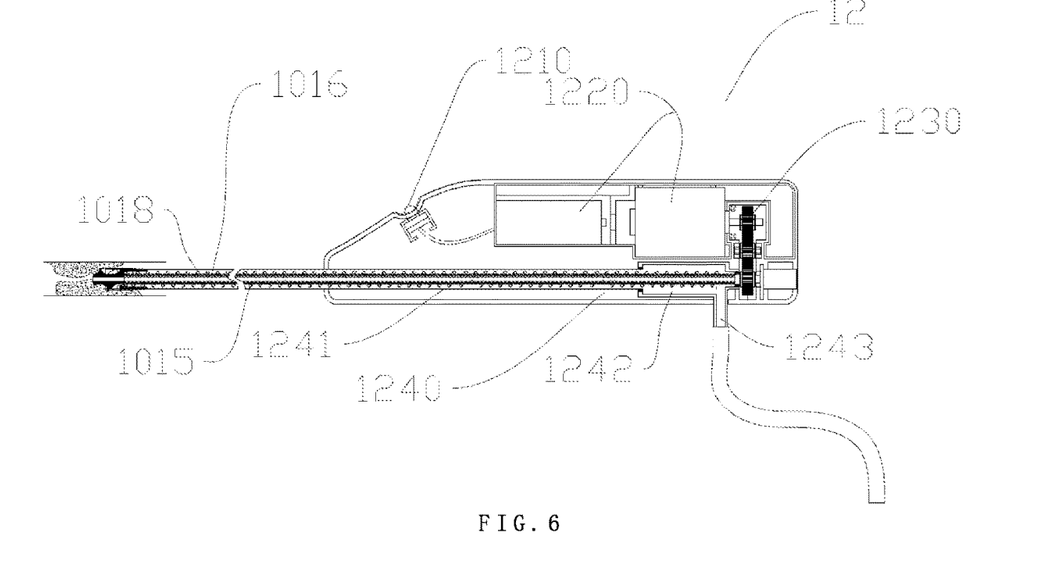
FIG. 6 is a schematic operation diagram of the volume reduction catheter system in Embodiment 1.

As shown in FIG. 5 to FIG. 6, FIG. 5 is a schematic operation diagram of a distal end of a volume reduction catheter system in Embodiment 1, and FIG. 6 is a schematic operation diagram of the volume reduction catheter system in Embodiment 1. The volume reduction catheter system 11 includes the above medical cutting assembly 10 and a control assembly 12 for controlling the actions of the medical cutting assembly 10. The cutter head 101 is driven to rotate by a transmission shaft 1015, and the first cannula 103 is rigidly connected with the limiting member 102. In this embodiment, the first cannula 103 and the limiting member 102 are welded. A distal end of the transmission shaft 1015 passes through the limiting member 102 and is connected with the cutter head 101. A proximal end of the transmission shaft 1015 is connected with the control assembly 12 outside the body. The control assembly 12 controls the movement of the cutter head 101 by means of controlling the action of the transmission shaft 1015 to cut and deliver tissues. The distal end of the cutter head 101 is partially exposed to cut a tissue. The first cannula 103 covers at least the through slot 1013 of the cutter head 101 to achieve radial limitation to the cutter head 101, and to fully prevent the cut tissue delivered by the cutter head 101 from leaving the delivery slot 1012 along the radial direction. After the exposed portion of the distal end of the cutter head 101 cuts a tissue, the tissue to be delivered moves towards the proximal end along the delivery slot 1012. When it reaches the through slot 1013, the tissue collides with the decomposing member 1021 and is decomposed into smaller tissues, and then is continued to be delivered towards the proximal end. Since the cut tissue is decomposed into the smaller tissues again, it is conducive to rapid and effective delivery, thus improving the overall cutting and delivery efficiency.

When it is necessary to adjust the extension length of the cutter head 101, the current position of the limiting member 102 is kept unchanged, the axial position of the cutter head 101 is adjusted by means of adjusting the axial position of the transmission shaft 1015 connected to the proximal end of the cutter head 101.

Further, a surface of the transmission shaft 1015 is provided with a helically extending transfer slot 1016. The transfer slot 1016 may transfer the tiny tissues collided with and decomposed by the decomposing member 1021 to the proximal end of the transmission shaft 1015 until the tissues are finally discharged. In addition, the surface of the transmission shaft 1015 is surrounded by a second cannula 1017 which plays the same protection role as the first cannula 103. It should be understood that the first cannula 103 and the second cannula 1017 can be of an integrated structure, that is, they can play a role as a complete cannula. The second cannula 1017, on the one hand, protects a blood vessel or an external tissue where the transmission shaft 1015 is located, and on the other hand, prevents the tiny tissues to be transferred from leaving the volume reduction catheter system 11 radially. The second cannula 1017 is connected to the proximal end of the limiting member 102 via a hot melt technique, and is interference fit with the proximal end of the limiting member 102.

The control assembly 12 includes a switch group 1210, a power group 1220, a transmission group 1230 and a separation seat 1240. The power group 1220 and the transmission group 1230 are rigidly connected. The transmission group 1230 includes several transmission combinations. In this embodiment, a gear set is selected as a transmission member. A first end of the gear set is connected to the power group 1220, and a second end is connected to the transmission shaft 1015. The gear set is dynamically hermetically connected with the transmission shaft 1015. In general, the switch group 1210 controls the rotation of the transmission shaft 1015 through the transmission group 1230. Specifically, the transmission shaft 1015 is mounted in the separation seat 1240.

The separation seat 1240 includes a first chamber 1241 and a second chamber 1242. The second chamber 1242 is communicated with a drain pipe 1243. The second cannula 1017 surrounds the surface of the transmission shaft 1015. For clearer understanding, a cutting position of the cutter head 101 of the volume reduction catheter system is a cutting section. The second cannula 1017 and a portion of the transmission shaft 1015 surrounded by the second cannula 1017 form a transfer section. A portion of the control assembly 12 is a collection section. The transfer section extends from the position of the cutter head 101 of the cutting section to the first chamber 1241 of the collection section. At the proximal end of the transfer section, the proximal end of the second cannula 1017 is sealed to an inner wall of the first chamber 1241. The transmission shaft 1015 continues to extend to the second chamber 1242. The transfer slot 1016 on the surface of the transmission shaft 1015 also extends to the second chamber 1242, and the proximal end of the transmission shaft 1015 is sealed to an inner wall of the second chamber. Therefore, the tissues cut from the position of the cutter head 101 of the cutting section will gradually enter the collection section along the transfer slot 1016. Specifically, the tissues will gradually enter the first chamber 1241, then reach the second chamber 1242, and finally be discharged to a collection device or to the outside along the drainage pipe 1243.

In order to facilitate the processing of the transmission shaft 1015 and the stability of the formed structure, in this embodiment, a coil spring 1018 is wound on the surface of the transmission shaft 1015 to form the transfer slot 1016. On the one hand, the transmission shaft 1015 needs to conform to the blood vessels, so that it is flexible. The coil spring 1018 can strengthen the supporting role of the transmission shaft 1015, that is, the supporting role of the transmission shaft is enhanced on the premise of ensuring that the transmission shaft 1015 can conform to the bending of the blood vessels. On the other hand, the coil spring 1018 is elastic, which can play a buffering role when the cutter head 101 rotates for cutting.

Figure 7:
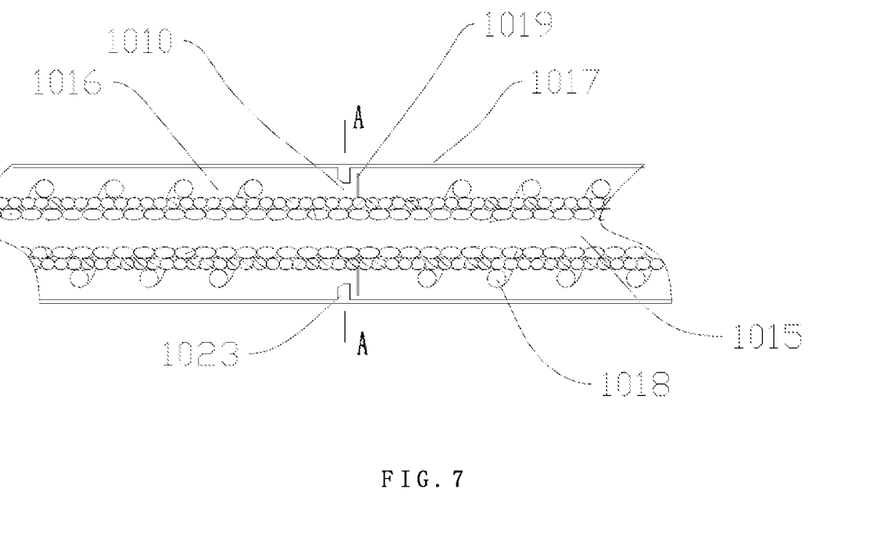
FIG. 7 is a schematic diagram of a transfer section of the volume reduction catheter system in Embodiment 1.
Figure 8:
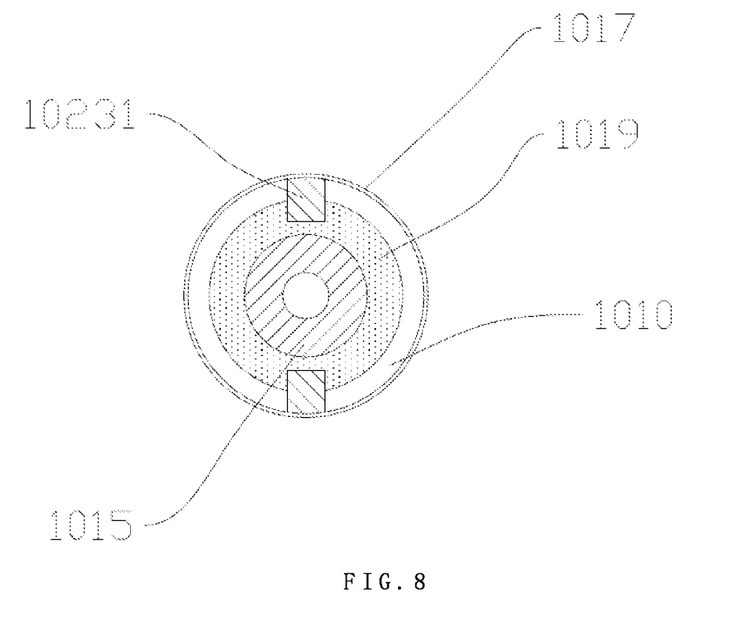
FIG. 8 is a schematic cross-sectional diagram taken along line A-A in FIG. 7.

In this embodiment, several cleaning and decomposing portions are also arranged in the transfer section. Specifically, as shown in FIG. 7 to FIG. 8, with FIG. 7 being a partial schematic diagram of the transfer section of the volume reduction catheter system in Embodiment 1, and FIG. 8 being a schematic cross-sectional diagram taken along the line A-A in FIG. 7. A first cleaning and decomposing portion 1023 is arranged in the transfer section. In addition, the first cleaning and decomposing portion 1023 includes several cleaning and decomposing members 10231 extending along the inner wall of the second cannula 1017 in the axial direction (the cleaning and decomposing member 10231 here may have the same structure as the decomposing member in this embodiment), and the shape of the cleaning and decomposing member 10231 is not limited. When the transfer slot 1016 transfers a tissue to the position of the first cleaning and decomposing portion 1023, the tissue collides with the first cleaning and decomposing portion 1023 due to relative rotation between the transmission shaft 1015 and the second cannula 1017, thus decomposing the tissue into smaller tissues. A plurality of first cleaning and decomposing portions 1023 are arranged on the transfer section along the axial direction, which can further fully decompose the tissue located in the transfer slot 1016, thereby facilitating the cut tissues to be discharged. If a specific first cleaning and decomposing portion 1023 includes more cleaning and decomposing members 10231 distributed along the circumferential direction, the first cleaning and decomposing portion 1023 has higher decomposition efficiency.

In this embodiment, since the transfer slot 1016 is formed by winding the coil spring 1018, in order to ensure that the first cleaning and decomposing portion 1023 can fully contact the tissue transferred by the transfer slot 1016, the coil spring 1018 is set as a sectional type structure, that is, the coil spring 1018 is unconnected at the first cleaning and decomposing portion 1023, so as to ensure that the coil spring 1018 will not contact the decomposing portion 1023.

In order to improve the decomposition ability of the first cleaning and decomposing portion 1023, a first filter 1019 with a filter screen is arranged on the second cannula 1017 at the proximal end of the first cleaning and decomposing portion 1023. When the tissue cut by the cutter head is delivered to the proximal end, the tissue easily moves against a bulge of the first cleaning and decomposing portion 1023, without colliding with the first cleaning and decomposing portion 1023, which may result in insufficient decomposition. Therefore, the first filter 1019 is added near a cleaning and decomposing member 10231. That is, the cleaning and decomposing portion 1023 includes the cleaning and decomposing member 10231 and the first filter 1019 located at the proximal end of the cleaning and decomposing member 10231. The first filter 1019 is fixed on the transmission shaft 1015 and moves with the transmission shaft 1015. If the first filter 1019 is arranged at the distal end of the first cleaning and decomposing portion 1023, the tissue cannot reach the position of the first cleaning and decomposing portion 1023. Therefore, the first filter 1019 is arranged on one side of the proximal end of the first cleaning and decomposing portion 1023. Preferably, an end face of the distal end of the first filter 1019 contacts an end face of the proximal end of the first cleaning and decomposing portion 1023, or a distance between the end face of the distal end of the first filter 1019 and the end face of the proximal end of the first cleaning and decomposing portion 1023 is 0.1 mm to 5 mm. The operation is as follows:

The transmission shaft 1015 rotates at a high speed relative to the second cannula 1017. The cleaning and decomposing member 10231 is located on the inner wall of the second cannula 1017. The first filter 1019 is fixed on the transmission shaft 1015 and is located on one side of the proximal end of the cleaning and decomposing member 10231. There is a space between an outer side of the first filter 1019 and the second cannula 1017 to avoid many tissues from being accumulated on a surface of the first filter 1019. The first filter 1019 rotates with the transmission shaft 1015 relative to the cleaning and decomposing member 10231, and one part of the tissue that reaches the first cleaning and decomposing portion 1023 is further cleaned by the cleaning and decomposing member 10231, and the other part of the tissue is caught by a side surface and bottom surface of the cleaning and decomposing member 10231 and is continued to be transferred to the transfer section, so it is not cleaned. At this time, under the action of the first filter 1019, the tissue that has not been cleared previously is captured by the first filter 1019, while the cleaning and decomposing member 10231 passes through the surface of the first filter 1019. The side surface and bottom surface of the cleaning and decomposing member 10231 collide with and decompose the tissue captured by the first filter 1019, so as to achieve further decomposition, so that the cleaning effect of the first cleaning and decomposing portion 1023 is better.

Figure 9:
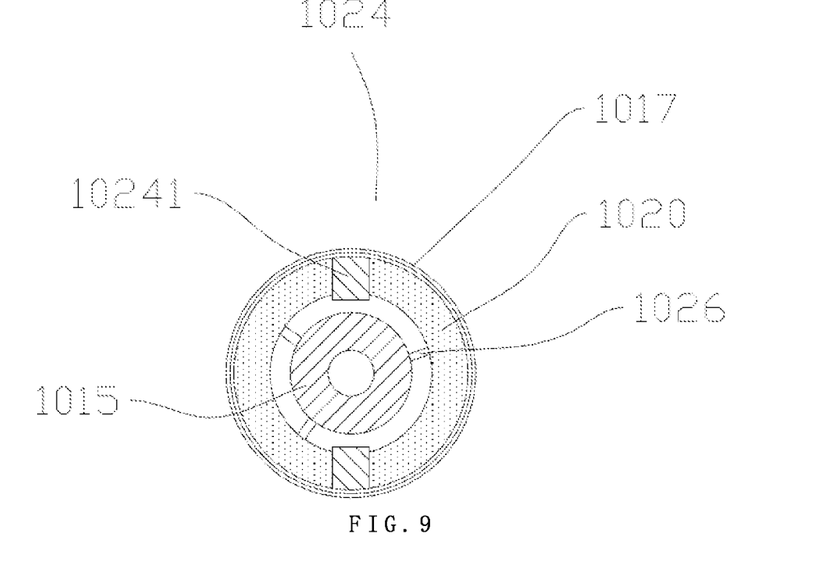
FIG. 9 is a schematic operation diagram of a second cleaning and decomposing portion of the volume reduction catheter system in Embodiment 1.

When the filter screen of the first filter 1019 has an extremely large area, the smooth flow of liquid will be affected, and the rotation of the first filter 1019 will be unstable. Therefore, there is a space 1010 between the first filter 1019 and the second cannula 1017. Since part of the tissue will be directly transferred through the space 1010 between the first filter 1019 and the second cannula 1017 without being cleaned and decomposed, referring to FIG. 9, a second cleaning and decomposing portion 1024 may be added at the proximal end of the first cleaning and decomposing portion 1023. FIG. 9 is a schematic operation diagram of the second cleaning and decomposing portion 1024 of Embodiment 1 of the present invention. The second cleaning and decomposing portion 1024 includes a cleaning and decomposing member 10241 and a second filter 1020. The structure of the second filter 1020 is different from that of the first filter 1019. The second filter 1020 is fixed on the transmission shaft 1015 through several connecting rods 1026. It is worth noting that a filter screen of the second filter 1020 is attached to the inner wall of the second cannula 1017, that is, the tissue escaping from the space 1010 of the first filter 1019 will be captured by the second filter 1020 and thus cleaned and decomposed by the cleaning and decomposing member 10241. A space is reserved between an inner side of the filter screen on the surface of the second filter 1020 and the transmission shaft 1015, which not only avoids the accumulation of the tissue on the surface of the filter screen, but also prevents a large filter screen from affecting the circulation of liquid.

Further, the radial thickness of the second filter 1020 is less than or equal to the radial thickness of the cleaning and decomposing member 10241, and the cleaning and decomposing member 10241 can cover all the surfaces of the second filter 1020, thereby fully decomposing the tissue.

It is worth noting that, in fact, the relative positions of the first cleaning and decomposing portion 1023 and the second cleaning and decomposing portion 1024 may not be limited, that is, a plurality of first cleaning and decomposing portions 1023 and second cleaning and decomposing portions 1024 may be provided, but it is preferred that at least one cleaning and decomposing member is arranged at the distal end of the filter, at least for the filter that is located farthest at the proximal end.

In another embodiment, the coil spring 1018 still adopts a continuous structure, and a space is reserved between the bulge of the first cleaning and decomposing portion 1023 and the coil spring 1018.

Figure 10:
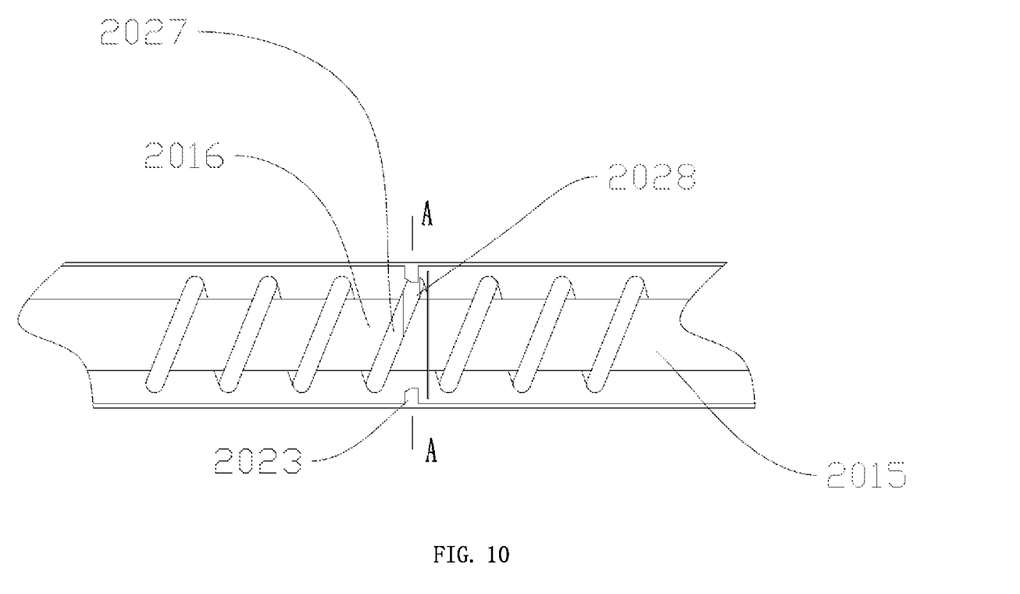
FIG. 10 is a partial schematic diagram of a transfer section of another volume reduction catheter system in Embodiment 1.

In another embodiment is shown in FIG. 10, where FIG. 10 is a partial schematic diagram of a transfer section of another volume reduction catheter system for Embodiment 1 of the present invention. The transfer slot 2016 of the transfer section is one part of the transmission shaft 2015, and a side wall 2027 of the transfer slot 2016 extends spirally along the transmission shaft 2015. At the position of the cleaning and decomposing member 2023, the corresponding position on the side wall 2027 of the transmission shaft 1015 is provided with an avoiding groove 2028 to avoid the cleaning and disassembly member 2023. The avoiding groove 2028 runs through the side wall 2027 and is distributed circumferentially. When the avoiding groove 2028 of the transfer slot 2016 radially overlaps the cleaning and decomposing member 2023, the avoiding groove 2028 receives the cleaning and decomposing member 2023, so as to avoid collision between the cleaning and decomposing member 2023 and the side wall 2027 of the transfer slot 2016.

In another embodiment, the cutter head 101 of the volume reduction catheter system is driven by the transmission shaft 1015, while the second cannula 1017 covers a part of the proximal end of the cutter head 101 (that is, the second cannula 1017 replaces the limiting member to extend to the cutter head 101). The second cannula 1017 of the volume reduction catheter system is provided with a plurality of cleaning and decomposing portions along the axial direction, and at least one cleaning and decomposing portion is located at the proximal end of the cutter head 101.

Embodiment 2

Figure 11:
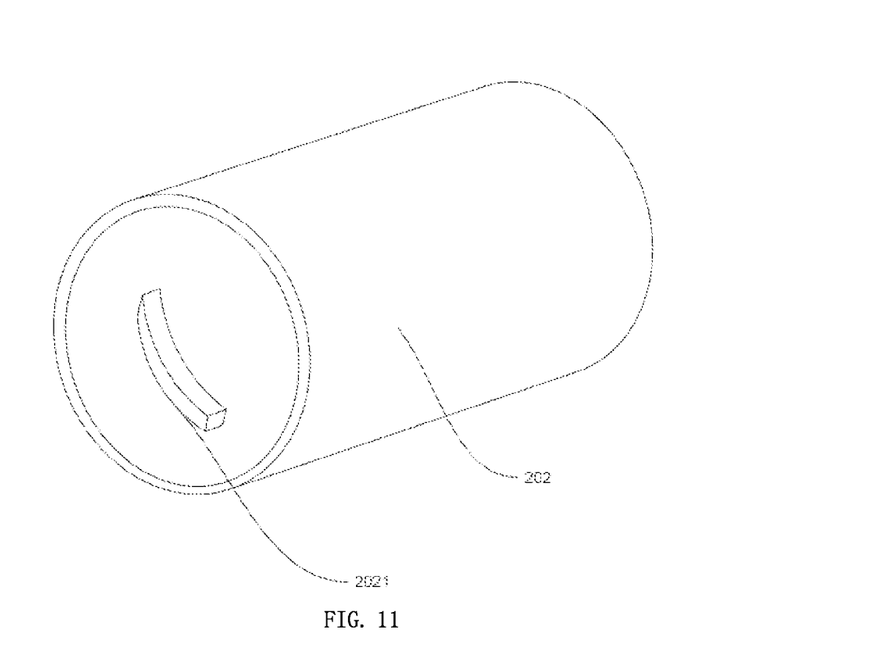
FIG. 11 is a schematic structural diagram of a limiting member of a medical cutting assembly in Embodiment 2.

FIG. 11 is a schematic structural diagram of a limiting member of a medical cutting assembly of a volume reduction catheter system in Embodiment 2. The same parts of the volume reduction catheter system and the medical cutting assembly of Embodiment 2 that are the same as those of Embodiment 1 will not be described here. In the previous embodiment, the limiting member is rigidly connected with the first cannula, that is, the limiting member and the first cannula can be an integrated structure. The limiting member and the first cannula can be formed into a whole by welding, molding, etc., or the structure of the limiting member can be changed, and one part of the limiting member can replace the first cannula. For a limiting member in Embodiment 2, a decomposing member 2021 is arranged on an inner wall of the middle portion of the limiting member 202. After the limiting member 202 is assembled with the cutter head, one part of a wall of the distal end of the limiting member 202 at least surrounds the proximal end of the cutter head. At this time, one part of the wall of the distal end of the limiting member 202 plays the same role as the first cannula in foregoing Embodiment 1. The limiting member 202 in Embodiment 2 has undergone structural changes relative to the limiting member in Embodiment 1, which eliminates the design of the first cannula, thus improving the production efficiency and reducing the process cost, all of which has been done without considering processing problems such as whether the connection strength between a cannula and the limiting member is sufficient, and whether the sealing is sufficient.

In the subsequent improvement scheme based on Embodiment 2, the term "first cannula" refers to a part of the wall of the distal end of the limiting member 202 that plays the same role as the first cannula in this embodiment.

Embodiment 3

In Embodiment 3, the connection for the cutter head and the limiting member is different from that in Embodiment 1, and the arrangement of the cannula is the same as that in Embodiment 1. The parts of the volume reduction catheter system and the medical cutting assembly of Embodiment 3 that are the same as those of Embodiment 1 will not be described here.

Figure 12:
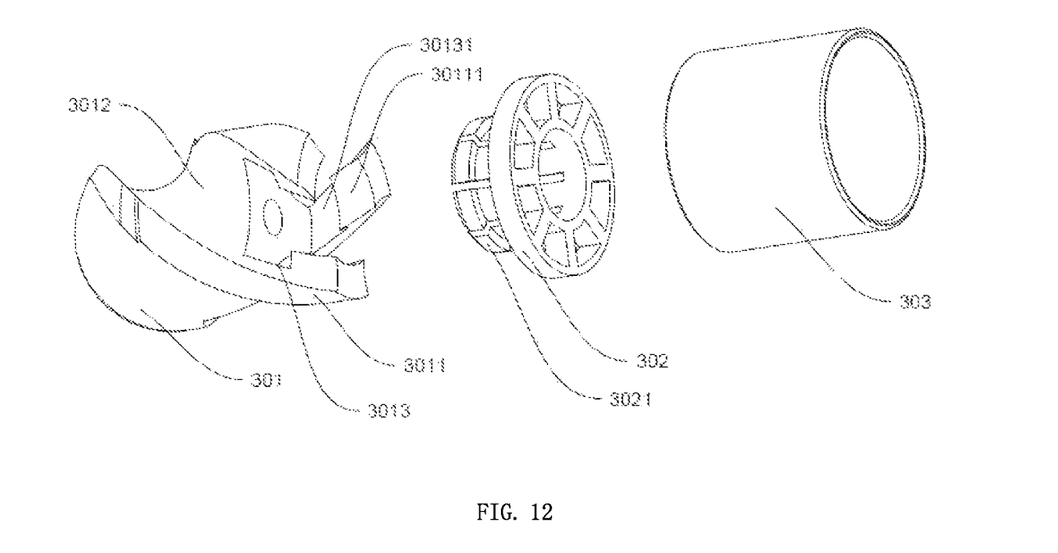
FIG. 12 is an exploded diagram of a medical cutting assembly in Embodiment 3.
Figure 13:
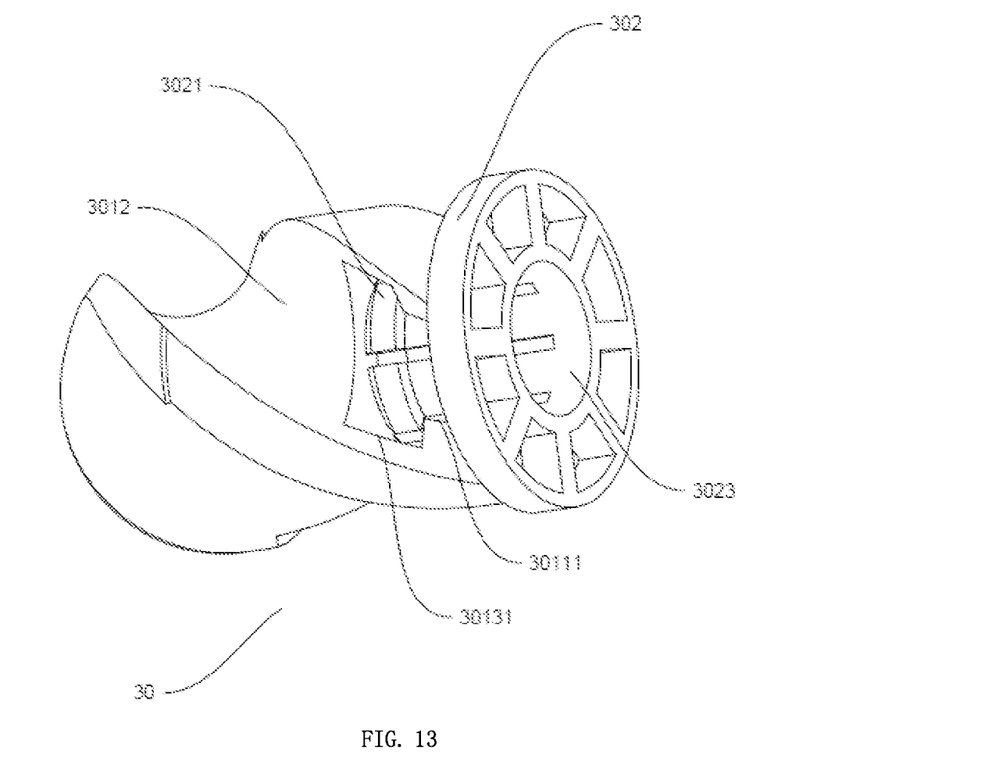
FIG. 13 is a schematic mounting diagram of a cutter head and a limiting member of a medical cutting assembly in Embodiment 3.
Figure 14:
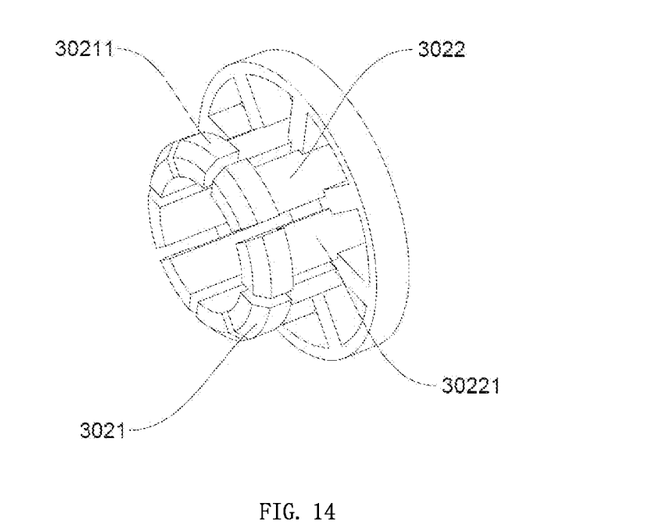
FIG. 14 is a schematic structural diagram of a limiting member of a medical cutting assembly in Embodiment 3.

Referring to FIG. 12 to FIG. 14, FIG. 12 is an exploded diagram of the medical cutting assembly in Embodiment 3, FIG. 13 is a schematic mounting diagram of a cutter head and a limiting member of a medical cutting assembly in Embodiment 3; and FIG. 14 is a schematic structural diagram of a limiting member of a medical cutting assembly in Embodiment 3. In this embodiment, the medical cutting assembly 30 includes a cutter head 301, a limiting member 302 and a first cannula 303 which are coaxially assembled. It should be clear that except for changes in connection positions and structures of the cutter head 301 and the limiting member 302, other structures, functions and related extension schemes irrelevant to the connection positions and structures in Embodiment 3 are the same as in Embodiment 1.

In Embodiment 3, a delivery slot 3012 is formed between two adjacent cutting edges 3011, and the proximal end of the cutter head 301 is also provided with a plurality of through slots 3013. Each through slot 3013 extends circumferentially through the cutting edge 3011 where it is located and is communicated with the delivery slot 3012 adjacent to the cutting edge 3011. It should be noted that the through slot 3013 is located on an inner side of the proximal end of the cutting edge 3011, and a bottom surface 30131 of the through slot 3013 and an inner wall surface 30111 of the proximal end of the cutting edge 3011 form a step surface. The distance from the bottom surface 30131 of the through slot 3013 to the rotation axis of the cutter head 301 is greater than the distance from the inner wall surface 30111 of the proximal end of the cutting edge 3011 to the rotation axis of the cutter head 301.

The limiting member 302 includes decomposing members 3021 and connection portions 3022. The decomposing members 3021 are arranged at positions that are close to the end portions of the distal ends of the connection portions 3022, and the decomposing members 3021 protrude from outer walls of the connection portions 3022.

In this embodiment, in order to ensure that the decomposing members 3021 can be accommodated in the through slots 3013, in addition to satisfying the relevant setting on the axial width in Embodiment 1, the following two requirements need to be met:

First, the distance from a top surface 30211 of each decomposing member 3021 and the rotation axis of the limiting member 302 is less than or equal to the distance from the bottom surface 30131 of each through slot 3013 to the rotation axis of the cutter head 301.

Second, the distance from the inner wall surface 30111 of the proximal end of each cutting edge 3011 to the rotation axis of the cutter head 301 is greater than or equal to the distance from a surface 30221 of each connection portion 3022 to the rotation axis of the limiting member 302. Since the cutter head 301 is coaxial with the limiting member 302, the rotation axis of the cutter head 301 and the rotation axis of the limiting member 302 are the same straight line.

When the cutter head 301 rotates, the decomposing members 3021 alternately enter the through slots 3013 and the delivery slots 3012. The decomposing members 3021 collide with tissues in the delivery slots 3012 and decompose the tissues into smaller tissues. In order to achieve a better decomposition effect, under the condition of meeting the above requirements, the distance from the top surface 30211 of the decomposing member 3021 to the rotation axis of the limiting member 302 is greater than or equal to the distance from the inner wall surface 30111 of the proximal end of each cutting edge 3011 and the rotation axis of the cutter head 301.

In order to ensure that the transmission shaft in the volume reduction catheter system in Embodiment 3 can correctly drive the cutter head 301 to rotate, a center portion of the limiting member 302 is provided with a channel 3023 from the proximal end to the distal end of the limiting member for the transmission shaft to extend therethrough.

In another embodiment, the tissue is delivered through a delivery cavity inside the cutter head. The delivery cavity is a cavity arranged inside the cutter head. The delivery cavity includes an input port located at the distal end of the cutter head and an output port located at the proximal end of the cutter head. The output port is close to the through slot. The tissue cut by the distal end of the cutter head enters the delivery cavity from the input port and leaves the delivery cavity from the output port. When it reaches the through slot, the tissue collides with the decomposing member and is further decomposed.

Further, a delivery slot structure as in Embodiment 1 can be arranged inside the delivery cavity to facilitate the delivery of the tissue.

Embodiment 4

Based on Embodiments 1-3, in order to improve the decomposition efficiency of the medical cutting assembly, a decomposing slot may be arranged on an inner wall of a cannula (including a first cannula and a second cannula). When the cutter head and the cannula rotate relative to each other, excess tissue delivered in a delivery slot collides with a side wall of the decomposing slot to achieve further decomposition. A larger side wall area of the decomposing slot indicates higher decomposition efficiency. For a decomposing slot with a fixed shape, when the decomposing slot runs through a cannula wall of the cannula to form a window, the decomposition efficiency of the entire medical cutting assembly is improved the most.

Embodiment 5

Figure 15:
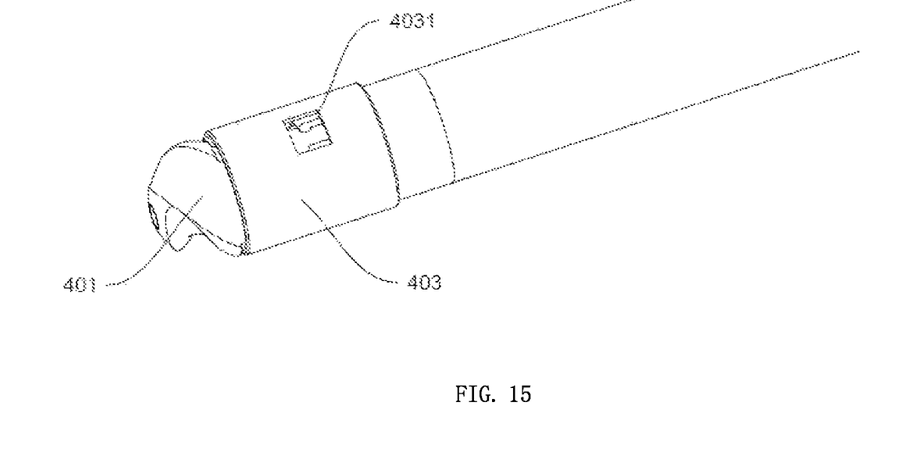
FIG. 15 is a schematic structural diagram of a distal end of a volume reduction catheter system in Embodiment 5.

FIG. 15 is a schematic structural diagram of a distal end of the volume reduction catheter system in Embodiment 5. The parts of the volume reduction catheter system and the medical cutting assembly of Embodiment 4 that are the same as those of Embodiments 1 to 4 will not be described here. The main improvement of Embodiment 4 is as follows: One decomposing slot is added on the first cannula 403 of the medical cutting assembly in Embodiment 4. The decomposing slot needs to be communicated with the delivery slot (or delivery cavity) at some point in time, so that the tissue in the delivery slot (or delivery cavity) can enter the decomposing slot to collide with the inner side wall of the decomposing slot for further decomposition. In order to achieve a better effect, the decomposing slot in Embodiment 4 extends through the cannula wall of the first cannula 403 to form a first window 4031. The first window 4031 can improve the decomposition efficiency of the window position. Specifically, when the cutter head 401 rotates at a high speed, one part of the cut tissue in the delivery slot (or delivery cavity) will collide with the side wall of the first window 4031 and be further decomposed.

Since the first window 4031 is very small relative to the entire surface of the first cannula 403, and a space between an outer surface of the first cannula 403 and an inner wall of a blood vessel is small, when the cutter head 401 rotates at a high speed, almost no tissue to be delivered to the proximal end will leave the medical cutting assembly from the first window 4031.

In order to achieve a better decomposition effect, the first window 4031 is arranged so that at least one decomposing member is located between an end portion of the distal end of the first window 4031 and an end portion of the proximal end along the axial direction. The reason is that the cutter head and the limiting member in the medical cutting assembly rotate relative to each other to drive the delivery slot to rotate relative to the decomposing member.

The decomposing member collides with an excess tissue in the delivery slot along the circumferential direction, causing the excess tissue in the delivery slot to be collided to move and to be transferred for further decomposition by collision. One part of the moved excess tissue collides with the inner wall of the first window 4031 again, which leads to further decomposition. In other words, when passing through the delivery slot, the decomposing member drives the excess tissue in the delivery slot to collide with the side wall of the first window 4031, so as to achieve the best decomposition effect of the first window 4031 at this position.

Embodiment 6

Figure 16:
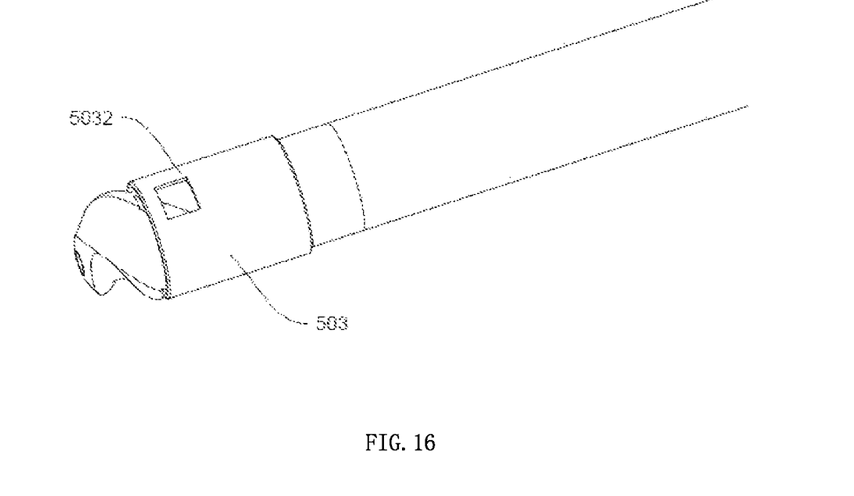
FIG. 16 is a schematic structural diagram of a distal end of a volume reduction catheter system in Embodiment 6.

FIG. 16 is a schematic structural diagram of the distal end of a volume reduction catheter system in Embodiment 6. The volume reduction catheter system and the medical cutting assembly of Embodiment 6 are improved on the basis of Embodiment 5. The parts of the volume reduction catheter system and the medical cutting assembly of Embodiment 6 that are the same as those of Embodiment 5 will not be described here. A main difference between the two embodiments is that one decomposing slot is added in the medical cutting assembly in Embodiment 6 on the basis of Embodiment 5. Similarly, the decomposing slot extends through the cannula wall of the first cannula 503 to form a second window 5032. The original first window is located at the back of the second window 5032, and is not shown. The second window 5032 is located at the distal end of the first cannula 503. A side wall of the second window 5032 collides with the cut tissue located inside the distal end of the first cannula 503. These tissues are further decomposed into smaller tissues, which improves the decomposition efficiency of the medical cutting assembly at the distal end of the first cannula 503.

Embodiment 6 is an improvement based on the design of a single decomposing slot in Embodiment 5; that is, in Embodiment 6, the decomposing slot is added at a position that is different from the decomposing slot in Embodiment 5 on the limiting member to improve the decomposition efficiency at different positions, thereby improving the overall decomposition efficiency of the medical cutting assembly. Therefore, based on this idea, the embodiment in which a plurality of decomposing slots is arranged on the limiting member should be regarded as being equivalent to Embodiment 5 or 6. In addition, in Embodiments such as Embodiments 5 and 6, where decomposing slots are added on the medical cutting assembly, the specific shape and number of decomposing slots are not limited. In order to achieve a better decomposition effect, at least one decomposing member is located between the end portion of the proximal end of one decomposing slot and the end portion of the distal end along the axial direction of the limiting member.

It should be noted that the decomposing slot may also be used in the transfer section. What is different from Embodiments 5 to 6 is that in order to ensure reliable delivery of the cutting tissue by the transfer section, the decomposing slot cannot extend through an outer wall of the second cannula of the transfer section.

The above-mentioned embodiments only express several implementation modes of the present invention, and their descriptions are more specific and detailed, but they cannot be understood as limiting the patent scope of the present invention. It should be noted that those of ordinary skill in the art can further make various transformations and improvements without departing from the concept of the present invention, and these transformations and improvements all fall within the protection scope of the present invention. Therefore, the protection scope of the patent of the present invention shall be subject to the appended claims.

The above specifically describes specific implementations of the embodiments of the present invention. However, the present invention is not limited to the embodiments. Those skilled in the art can also make various equivalent deformations or alterations without departing from the spirit of the present invention. These equivalent deformations or alterations shall all fall within the scope defined by the claims of the present invention. The embodiments of the present invention and features in the embodiments can be combined with one another without conflicts.

The invention claimed is:

1. A medical cutting assembly, comprising a cutter head and a limiting member rotatably connected to the cutter head, wherein the cutter head comprises a delivery portion; the limiting member comprises a decomposing portion; and when the cutter head and the limiting member rotate relative to each other, and the decomposing portion extends through the delivery portion;

wherein the cutter head comprises a cutting portion; the cutting portion comprises a plurality of cutting edges extending from a proximal end to a distal end; the delivery portion comprises delivery slots located between two adjacent cutting edges; at least one cutting edge is provided with a through slot; the through slot is communicated with the delivery slot adjacent to the cutting edge; and when the cutter head and the limiting member rotate relative to each other, the decomposing portion extends through the delivery slots for multiple passes.

2. The medical cutting assembly according to claim 1, wherein there is one or more decomposing portions; and during the rotation of the cutter head, at least one part of at least one of the decomposing portions is always located in one through slot to axially limit the cutter head.

3. The medical cutting assembly according to claim 1, wherein there are a plurality of decomposing portions, at least two of which are spaced apart from each other along a circumferential direction or an axial direction of the limiting member.

4. The medical cutting assembly according to claim 1, wherein the cutting edges extend spirally from the proximal end to the distal end, and helical angles of the delivery slots gradually decrease from the distal end to the proximal end.

5. The medical cutting assembly according to claim 1, wherein the medical cutting assembly further comprises a cannula connected to the limiting member; the cannula surrounds the cutter head and the limiting member; and the cannula at least covers the decomposing portion in the axial direction.

6. The medical cutting assembly according to claim 5, wherein the cannula is provided with several decomposing slots; and when the cutter head and the limiting member rotate relative to each other, the decomposing slots and the delivery portions communicate with each other.

7. The medical cutting assembly according to claim 5, wherein the axial width of the decomposing portion is less than the axial width of each through slot; and the axial position of an end portion of the proximal end of the decomposing portion relative to an end portion of the proximal end of the through slot is adjustable.

8. The medical cutting assembly according to claim 1, wherein each decomposing portion is located in the middle of the limiting member, and one part of the limiting member at least surrounds the proximal end of the cutter head.

9. A volume reduction catheter system, comprising a cutting section and a transfer section which are sequentially arranged, wherein the cutting section comprises a cutting assembly; the transfer section comprises a transmission shaft fixedly connected with the cutting assembly, and a cannula surrounding a surface of the transmission shaft; the transmission shaft rotates relative to the cannula; the transmission shaft is provided with a transfer slot; the cannula is axially provided with a cleaning and decomposing member; and the transmission shaft is axially provided with a filter.

10. The volume reduction catheter system according to claim 9, wherein there are a plurality of cleaning and decomposing members and a plurality of filters; and at least one cleaning and decomposing member is located at the distal ends of all the filters.

11. The volume reduction catheter system according to claim 9, further comprising at least one cleaning and decomposing portion, wherein the cleaning and decomposing portion comprises the cleaning and decomposing member and a filter located at a proximal end of the cleaning and decomposing portion; and the filter comprises a first filter and/or a second filter.

12. The volume reduction catheter system according to claim 11, wherein the filter comprises the first filter; and a space is provided between an outer side of the first filter and an inner wall of the cannula.

13. The volume reduction catheter system according to claim 11, wherein the filter comprises the second filter; and a space is provided between an inner side of the second filter and the transmission shaft.

14. The volume reduction catheter system according to claim 13, wherein the second filter is fixed on the transmission shaft through a connecting rod, and an outer side of the second filter is coupled to the inner wall of the cannula.

15. The volume reduction catheter system according to claim 14, wherein the radial thickness of the filter is less than or equal to the radial thickness of the decomposing member.

16. The volume reduction catheter system according to claim 11, wherein the cleaning and decomposing portion comprises a first cleaning and decomposing portion with the first filter and a second cleaning and decomposing portion with the second filter; and the first cleaning and decomposing portion and the second cleaning and decomposing portion are arranged alternately in turn.

17. A volume reduction catheter system, comprising a cutting section and a transfer section which are sequentially arranged, wherein the cutting section comprises a cutting assembly; the transfer section comprises a transmission shaft fixedly connected with the cutting assembly, and a cannula surrounding a surface of the transmission shaft; the transmission shaft rotates relative to the cannula; the transmission shaft is provided with a transfer slot; a cleaning and decomposing portion is arranged on an inner wall of the cannula; and the cleaning and decomposing portion comprises a decomposing member extending towards the transmission shaft;

wherein the axial width of the decomposing portion is less than the axial width of each through slot; and the axial position of an end portion of the proximal end of the decomposing portion relative to an end portion of the proximal end of the through slot is adjustable.

\* \* \* \* \*